United States Patent [19]
Gasser

[11] 3,881,022
[45] Apr. 29, 1972

[54] FLAVORING AGENT

[75] Inventor: Rupert Josef Gasser, Marysville, Ohio

[73] Assignee: Societe d'Assistance Technique pour Produits Nestle S.A., Lausanne, Switzerland

[22] Filed: Sept. 27, 1972

[21] Appl. No.: 292,724

[30] Foreign Application Priority Data
Sept. 28, 1971 Switzerland.................. 14114/71

[52] U.S. Cl. .................. 426/48; 426/60; 426/65; 426/221; 426/364; 426/380
[51] Int. Cl. ................................ A23l 1/26
[58] Field of Search ........... 426/48, 55, 59, 60, 212, 426/65, 175, 221, 342, 364, 371, 380

[56] References Cited
UNITED STATES PATENTS
3,102,817 9/1963 Green ................................ 426/65
3,645,753 2/1972 Gasser ............................ 426/65 X

*Primary Examiner*—Raymond N. Jones
*Assistant Examiner*—Esther L. Massung
*Attorney, Agent, or Firm*—Watson Leavenworth Kelton & Taggart

[57] ABSTRACT

A meat flavoring agent is prepared by adding enzymes contained in fresh meat to a solution of yeast autolysate and a hexose, subjecting the mixture to a specific temperature/pH treatment and finally heating. Other features of the invention are disclosed in the Specification.

14 Claims, No Drawings

FLAVORING AGENT

The present invention is concerned with the preparation of substances having the aroma and flavor of cooked meat.

In accordance with the invention, there is provided a process for preparing a meat flavoring which comprises adding enzymes present in fresh meat to an aqueous solution containing yeast autolysate and a hexose, the total dry matter content and the hexose content of the solution not exceeding, respectively, 25 and 1.5% by weight and the yeast autolysate being present in an amount of at least 15 times the weight of hexose, subjecting the resulting mixture to a treatment which comprises maintaining the pH of the solution between 4.0 and 7.0, and adjusting its temperature at below 37°C if the pH is between 4.0 and 6.0, or at below 15°C if the pH is between 6.0 and 7.0, thereafter concentrating the solution to a dry matter content not exceeding 65% by weight, adjusting the pH of the resulting concentrated solution to a value of 6.0 to 6.4 and finally heating the solution at a temperature of 90° to 100°C for at least 15 minutes.

The fresh meat enzymes used in the process according to the invention may be added, for example, as finely subdivided fresh, raw meat or as an extract of such meat. By "fresh meat" is meant raw meat obtained from the carcass of an animal slaughtered not more than 24 hours before use, or which has been preserved at low temperatures (deep-frozen) under conditions such that on thawing it is in all respects similar to the meat obtained from a carcass less than 24 hours after slaughter. In particular, the meat must possess enzyme activity by virtue of the presence of enzymes of the following 3 groups:- proteolytic enzymes, particularly
  katepsins
  enzymes degrading nucleotides such as
  adenosine triphosphate
  enzymes capable of converting carbohydrates,
  particularly hexoses, into hexose
  phosphates, pentose phosphates and
  lactates.

Preferably, the amount of fresh meat used is between 1 and 15% by weight of the autolysate/hexose solution, or a quantity of extract corresponding to such an amount of fresh meat. An extract may be prepared using water or a solution of a salt such as sodium or potassium chloride. The meat is advantageously lean beef, and amounts within the range 3–5% by weight are highly satisfactory. Subdivision by cooloid milling is particularly preferred.

The yeast autolysate preferably contains, on a dry matter by weight bases, less than 2% of reducing substances. Among hexoses glucose and fructose are preferred, and the dry matter content of the solution is advantageously around 20% by weight.

The treatment at pH 4 to 7 is of particular significance, and it is generally desired to maintain the enzyme/substrate mixture under these conditions for at least 48 hours. Particularly preferred treatment temperatures are 12°C and below, and the mixture may be maintained at these temperatures for 60 to 70 hours. It should, on the other hand, be noted that the treatment temperature is adjusted having regard to the pH, rather than vice versa, which means that if the temperature is maintained below 15°C, the pH may vary within the broad range of 4 to 7, whereas a pH of 4 to 6 is required if a temperature between 15° and 37°C is chosen. The pH adjustments may be made by addition of appropriate amounts of alkali, such as sodium acid, glutamic acid, aspartic acid or hydrochloric acid.

According to one particularly preferred embodiment of the invention, the pH may be varied during the treatment, within the defined limits. Furthermore, when the pH is between 4.0 and 6.0, the temperature may be raised above 15°C, which has a favorable effect on the kinetics of the enzyme reaction and allows the total treatment time to be shortened.

Upon completion of the treatment, and before concentration, the pH of the solution is preferably adjusted to a value of 4.8 to 5.5, desirably 5.0 – 5.2. This pH adjustment is desirable because loss of volatile aromas may be reduced in the subsequent concentration step, especially if evaporation is employed. Insoluble matter present in the solution may be removed before or after the pH adjustment. Concentration of the solution, desirably to about 60% by weight of dry matter, may be effected by classical techniques, such as evaporation, reverse osmosis or flashing.

The concentrated solution is then heated at 90° – 100°C for at least 15 minutes, preferably 40 minutes at 90°C, its pH having first been adjusted to a value between 6.0 and 6.4, e.g. 6.2. After heating, the concentrated solution may be dried, or used directly as a paste. If the paste is to be dried (spray or drum for example) its pH is advantageously lowered to 5.5 or below whereby aroma losses may be diminished. The concentrate may also be dried with a support or carrier such as corn syrup, starch or a gum.

The finished product has the characteristic flavor and aroma of roasted meat, and may be used in various foodstuffs, including soups, bouillons, prepared dishes, canned or frozen food items, snacks and the like, as well as for flavoring textured protein products obtained by spinning or extrusion of vegetable or microbial proteins.

A product having the aroma and flavor of a stock or bouillon prepared from fresh meat may be obtained by addition of a fat to the concentrated solution before it is heated. Depending on the flavour desired, beef or chicken fat may be added, at a level of 2.5 to 5.0% by weight of the solution.

Furthermore, extracts of vegetables such as celery, carrot or leek may also be added before heating. Such extracts may be prepared by conventional procedures, involving cooking, stripping, separation of insolubles and combination of stripped aromas with concentrated extract. The concentrated extracts may also be dried with a support such as malto-dextrin.

Finally, it is also possible to add various flavor precursors to the concentrated solution before heating, such as the following, expressed in parts per thousand of the dry matter content of the concentrated solution:-

| | |
|---|---|
| cysteine | 0.1 – 0.3 |
| methionine | 0.1 – 0.3 |
| thiamine | 0.05 – 0.2 |

Each of these substances may be added singly or in combinations of two or all three, if desired together with the optional ingredients noted previously (fats, vegetable extracts). Nucleotides such as inosine or guanosine monophosphate may be added to the finished product, at a level of 1 – 2% by weight on dry matter.

The invention is illustrated by the following examples, in which the percentages are by weight.

EXAMPLE 1

An aqueous solution is prepared containing 1% of glucose and 20% dry matter of a yeast autolysate having the following composition:-

| | |
|---|---|
| Total nitrogen | 7.7% |
| Amino nitrogen | 4.3% |
| Reducing substances | 1.1% |
| NaCl | 17.0% |
| $P_2O_5$ | 3.9% |
| Ash | 22.6% |
| Glutamic acid | 4.3% |
| Dry matter | 79.5% |

4% of fresh beef, ground in a colloid mill, are added to the solution, the mixture is cooled to 10°–12°C and maintained at these temperatures, with stirring, for 60 hours. The pH is maintained at 5.

At the end of the treatment, insoluble solids are filtered off and the solution is concentrated by evaporation to about 60% solids. The pH of the concentrated solution is then raised to 6.2 and it is heated at 90°C for 40 minutes. The pH is then adjusted to 5.0 and the solution is spray-dried.

The resulting product has a strong flavor and aroma of roast beef.

EXAMPLE 2

An aqueous solution of glucose and yeast autolysate is prepared as in Example 1, and 4% of fresh beef, ground in a colloid mill, are added. The mixture is cooled to 10°–12°C and maintained at these temperatures, with stirring, for 60 hours. During this time the pH is adjusted periodically to different values, as shown in the table. It should be noted that between any two adjustments, the pH will itself have a tendency to decrease, so that the actual pH may be below the lowest adjusted value, particularly between 4.5 and 5.0 which is the most favorable range for the action of katepsins.

Table

| Time | (hours) | pH adjusted to |
|---|---|---|
| 0 | (start) | 7.0 |
| 18 | | 6.0 |
| 24 | | 5.5 |
| 42 | | 5.0 |
| 48 | | 6.0 |
| 60 | | end of treatment |

At the end of the treatment, insoluble matter is removed by centrifugation and the pH of the clarified solution adjusted to 5.1. The solution is then concentrated by evaporation to about 60% solids.

The pH of the concentrated solution is adjusted to 6.2 and 3% beef fat and 1% inosine monophosphate are added. The mixture is heated for 40 minutes at 90°C, the pH then adjusted to 5.0 and it spray-dried. spary-dried.

The resulting product has the flavor and aroma of a bouillon prepared from fresh beef.

EXAMPLE 3

An aqueous solution of glucose and yeast autolysate is prepared as described in Example 1, and 4% fresh beef, ground in a colloid mill, are added. The mixture is cooled with stirring to 10°–12°C and maintained for 66 hours with periodic pH adjustment in accordance with the program set out below:-

| Time | (hours) | pH adjusted to: |
|---|---|---|
| 0 | (start) | 7.0 |
| 18 | | 6.0 |
| 24 | | 5.5 |
| 42 | | 5.0 |
| 56 | | 6.0 |
| 66 | | end of treatment |

Insoluble matter is then filtered off and the resulting solution is treated as described in Example 2.

The product hsa the flavor and aroma of a bouillon prepared from fresh beef, with a more meaty note than the product of Example 2.

It should be observed that the pH program in the present example is such that, by reason of its own tendency to decrease, the pH of the mixture remains below 5.0 for 14 hours (42 to 56) which is particularly favorable for the action of katepsins, whereas in Example 2 the pH remains within this range for only 6 hours. This difference, resulting in a flavor improvement, emphasizes the significance of pH programming.

EXAMPLE 4

An aqueous solution of glucose and yeast autolysate is prepared as described in Example 1. 4% of fresh beef, ground in a colloid mill are added. The mixture is cooled with stirring to a temperature of 10°– 12°C, and temperature and pH are adjusted periodically to different values in accordance with the program set out below:-

| Time (hours) | | pH | temperature | |
|---|---|---|---|---|
| 0 | (start) | 7.0 | 10 – 12 | |
| 18 | | 6.0 | 10 – 12 | |
| 24 | | 5.5 | 37 | |
| 28 | | 5.0 | 37 | |
| 36 | | 6.0 | 10 – 12, | maintained until end of the treatment. |
| 48 | | end of treatment | | |

At the end of the treatment, the pH of the mixture is adjusted to 5.1 and insoluble matter removed by centrifugation.

The resulting solution is then concentrated by evaporation to about 60% solids.

The pH is adjusted to 6.2 and 0.25% cysteine, 0.25% methionine and 0.15% thiamine are added to this solution. This mixture is then heated at 90°C during 40 minutes and its pH is adjusted to 5.0.

The resulting product has the flavor and aroma of roast beef.

The features of the treatment described in this example are its duration, which is shorter than in the previous examples, and the temperature profile which has a maximum of 37°C during 12 hours. This raising of the temperature permits a reduction of the treatment time.

EXAMPLE 5

20 g of fresh beef are ground in a colloid mill and suspended in 10 ml of a 2% solution of sodium chloride in distilled water. This suspension is maintained at 10°C for 3 hours with stirring, and insoluble matter is then removed by centrifugation. The insoluble matter is resuspended at 10°C for 3 hours, with stirring, in 10 ml of 2% aqueous sodium chloride solution. After removal of insoluble matter, the two solutions are mixed, providing an extract of fresh meat.

The extract is added to 500 ml of an aqueous solution of glucose and yeast autolysate prepared as described in Example 1. The resulting solution is cooled and maintained at a temperature of 10° – 12°C and a pH of 5.0 for 60 hours.

At the end of the treatment, the pH is adjusted to 5.1, and the solution is concentrated by evaporation to about 60% solids. The pH is adjusted to 6.2 and 15 g of beef fat, 3 g of dried leek extract and 2 g of dried carrot extract are then added to the concentrated solution. The resulting mixture is then heated at 90°C for 40 minutes, the pH is adjusted to 5.0, and it is spray-dried.

The resulting powdered product has the flavor and aroma of a bouillon prepared from fresh beef.

I claim:

1. A process for preparing a meat flavoring which comprises adding a proteolytic enzyme, an enzyme capable of degrading nucleotides, and an enzyme capable of converting carbohydrates into hexose phosphates, pentose phosphates and lactates to an aqueous solution containing yeast autolysate and hexose, the total dry matter content of the solution not exceeding 25% by weight the hexose content of the solution not exceeding 1.5% by weight and the yeast autolysate being present in an amount at least 15 times the weight of hexose, subjecting the resulting mixture to a treatment for a period of time sufficient to effect enzymatic reaction upon said yeast autolysate and hexose, said treatment comprising maintaining the pH of the solution between 4.0 and 7.0, and adjusting its temperature to below 37°C if the pH is between 4.0 and 6.0, or to below 15°C if the pH is between 6.0 and 7.0, thereafter concentrating the solution to a dry matter content not exceeding 65% by weight, adjusting the pH of the resulting concentrated solution to a value of 6.0 to 6.4 and finally heating the solution to a temperature of 90° to 100°C for at least 15 minutes.

2. A process according to claim 1, in which the yeast autolysate has a content of reducing substances not exceeding 2% by weight on dry matter.

3. A process according to claim 1, in which the treatment is effected at a temperature below 12°C.

4. A process according to claim 1, in which the enzymes are added to the solution of yeast autolysate and hexose as fresh, raw, subdivided meat.

5. A process according to claim 4, in which the amount of fresh meat added corresponds to 1 to 15% by weight of the solution.

6. A process according to claim 4, in which the hexose is glucose or fructose.

7. A process according to claim 1, in which the enzymes are added to the solution of yeast autolysate and hexose in the form of an aqueous extract prepared from fresh, raw meat.

8. A process according to claim 1, in which after the treatment and before concentration, the pH is adjusted to a value of 4.8 to 5.5.

9. A process according to claim 1, in which 2.5% to 5% by weight of fat are added to the concentrated solution before heating.

10. A process according to claim 1, in which a vegetable extract is added to the concentrated solution before heating.

11. A process according to claim 1, in which at least one of the following substances is added to the concentrated solution in the specified amounts:-

| | | |
|---|---|---|
| cysteine | 0.1 to 0.3 | (parts per thousand (on weight of dry |
| methionine | 0.1 to 0.3 | (matter in concentrated (solution |
| thiamine | 0.05 to 0.2. | |

12. A process according to claim 1, in which, after heating, the concentrated solution is dried.

13. A process according to claim 12, in which after heating and before drying, the pH of the concentrated solution is adjusted to a value not exceeding 5.5.

14. A process according to claim 1, in which the treatment to effect enzymatic reaction is for a period of at least 48 hours.

* * * * *

UNITED STATES PATENT OFFICE
CERTIFICATE OF CORRECTION

Patent No. 3,881,022                     Dated April 29, 1975

Inventor(x)  RUPERT JOSEF GASSER

It is certified that error appears in the above-identified patent and that said Letters Patent are hereby corrected as shown below:

Page 1, Column 2, the second line from the top, the date of issuance should read --April 29, 1975--.

Column 1, line 51, "cooloid" should read --colloid--.

Column 2, lines 4 and 5 should read --such as sodium hydroxide, or an organic or mineral acid, for example lactic acid, glutamic acid, aspartic acid or hydrochloric acid.--

Column 3, lines 65 and 66 should read --5.0 and it is spray-dried.--

Column 4, line 21, "hsa" should read --has--.

Signed and Sealed this twenty-second Day of July 1975

[SEAL]

Attest:

RUTH C. MASON
Attesting Officer

C. MARSHALL DANN
Commissioner of Patents and Trademarks